INVENTORS
HENRY J. W. HUCKSTEP
JOHN H. BURNESS

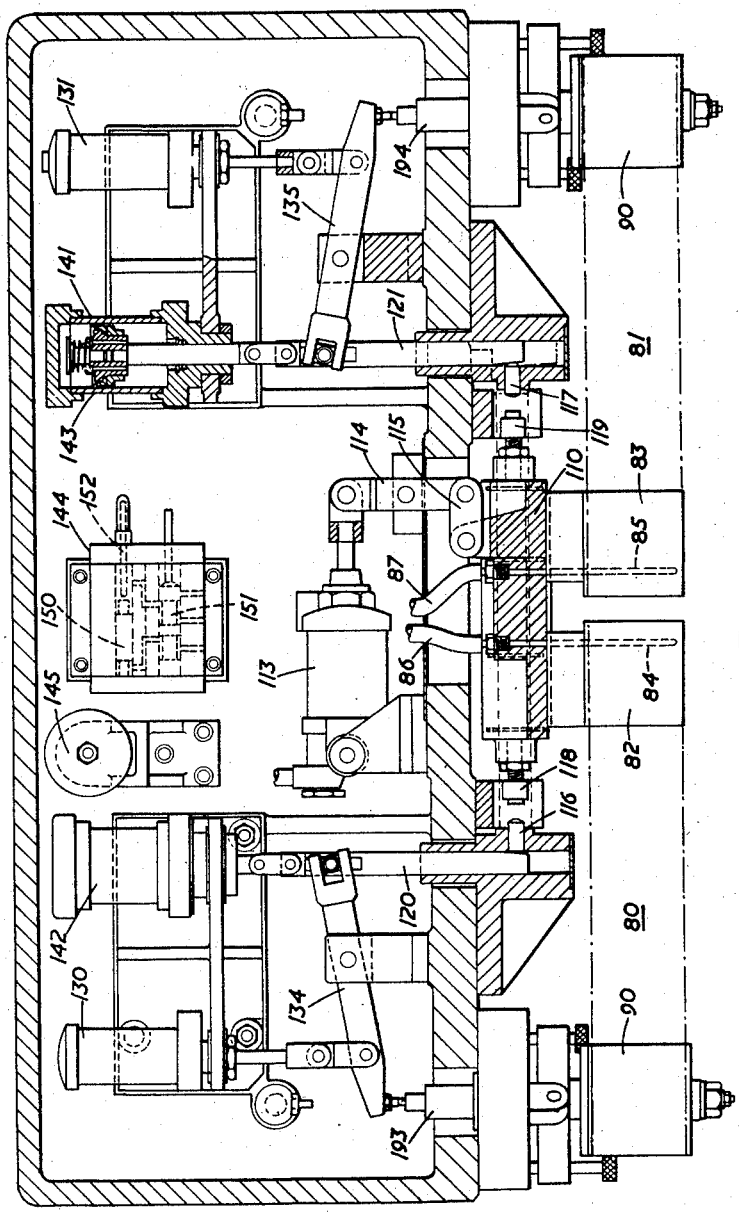

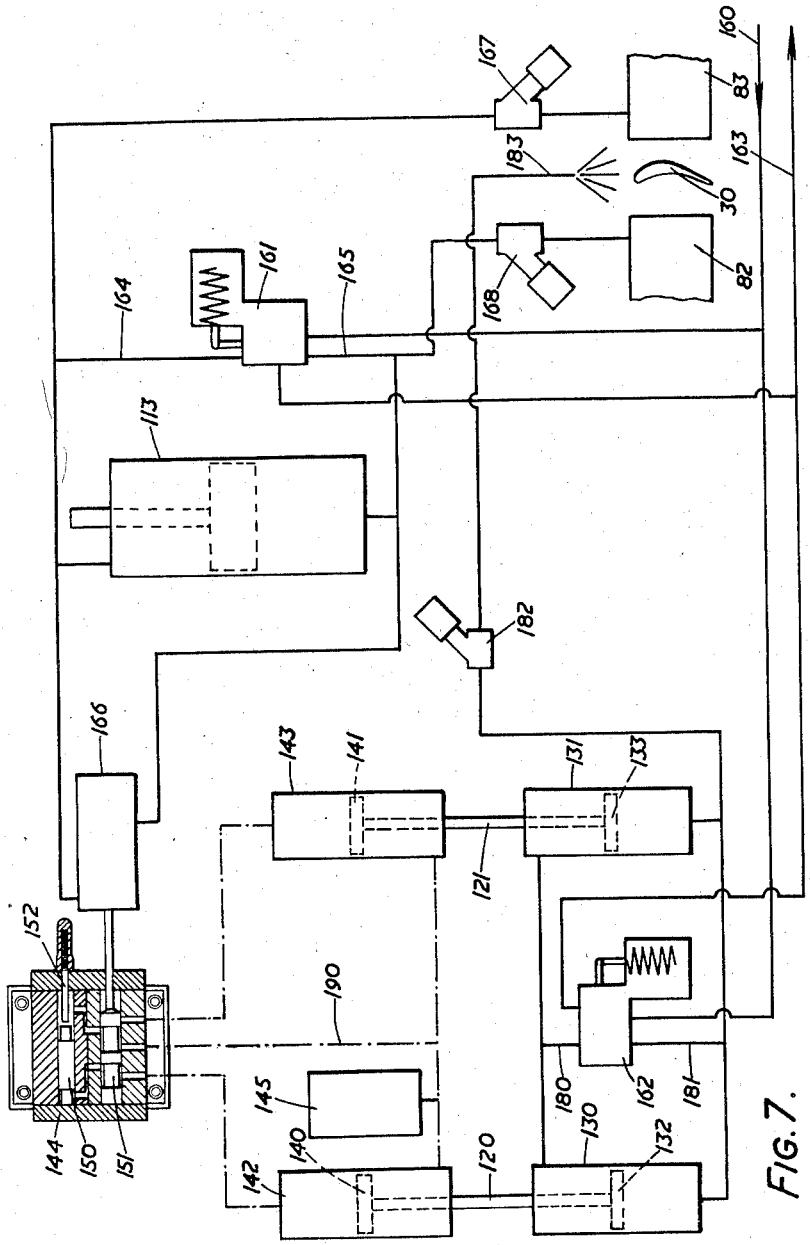

United States Patent Office 2,843,978
Patented July 22, 1958

2,843,978

APPARATUS FOR USE IN MACHINING PARTS TO A PREDETERMINED SURFACE CONTOUR

Henry John William Huckstep and John Henry Burness, Liverpool, England, assignors to D. Napier & Son Limited, London, England, a British company Application November 30, 1956, Serial No. 625,487

Claims priority, application Great Britain December 1, 1955

14 Claims. (Cl. 51—143)

This invention relates to apparatus for use in machining parts to a predetermined surface contour, particularly contours with straight line fairings, that is to say surfaces formed by the envelope of a lattice of straight lines, and also for some shapes with curved fairings particularly those formed by an envelope built up from a series or lattice of cylindrical or substantially cylindrical surfaces.

According to the invention apparatus for machining a workpiece to a predetermined contour comprises a cutting member having an effective cutting surface which is substantially in the form of part of a surface of revolution, means for bringing the cutting member into engagement with the workpiece, and means for moving the workpiece relative to the cutting member in a predetermined manner, to provide the desired contour thereon, including a supporting platform to which the workpiece to be machined can be secured, a pair of supporting members pivotally connected to two spaced points on the platform and means for automatically moving the supporting members independently and in a predetermined manner in two directions at right angles to one another and at right angles to the axis of revolution of the cutting surface.

Preferably the cutting member comprises an endless flexible abrasive belt, passing over a cylindrical or part cylindrical guide.

Moreover in a preferred construction the apparatus includes two cutting members disposed on opposite sides of the supporting platform, and means for bringing the cutting members alternately into engagement with the opposite sides of the workpiece.

The two cutting members are conveniently mounted on a common reciprocating support.

The apparatus will also preferably include feed means for feeding the (or each) cutting member progressively towards the workpiece up to a limiting position, so as to remove material progressively from the workpiece and provide a progressively increasing depth of "cut."

According to a preferred feature of the invention the pivotal connections between the supporting members and the work supporting platform are arranged to permit relative pivotal movement between the supporting members and the platform about axes parallel to both the directions of movement of the supporting members.

According to another preferred feature of the invention the cams are mounted on a common cam shaft, and including cam follower devices, the two cam follower devices which act on the supporting members each including a roller engaging a surface parallel to the direction of movement of the carrier member, to permit independent movement of the carrier member without any corresponding displacement of the supporting member in directions normal to the direction of movement of the carrier member.

The invention may be performed in various different ways but one specific embodiment will now be described by way of example with reference to the accompanying drawings in which:

Figure 6 is a plan view of the cutter control apparatus with the upper cover removed showing the mechanism controlling the movement of the cutting member, partly in section, and Figure 7 is a diagrammatic layout of the hydraulic and pneumatic control circuits associated with the control apparatus shown in Figure 6.

Figure 1:
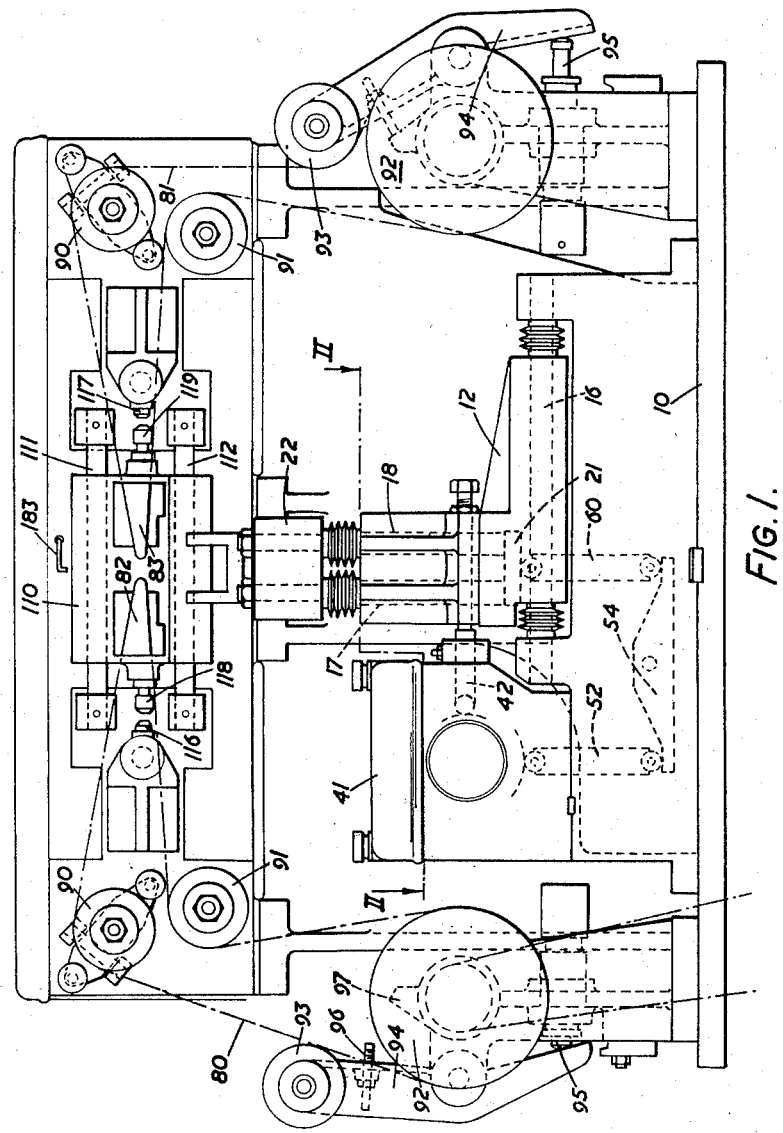
Figure 1 is a front elevation of an apparatus according to the invention designed to machine the convex and concave surfaces of a turbine blade.

The apparatus comprises a base 10 on which are mounted two slides 11, 12, constituting carrier members, each supported on a pair of parallel horizontal fixed guides 13, 14, 15, 16, so as to be capable of movement in a horizontal plane laterally across the front of the machine. The guides are each provided with frictionless linear bearings to prevent any movement of the slides transverse to the length of the guides, and to prevent tilting of the slides, while allowing free movement along their length.

Each of the slides 11, 12 is formed with an upper pillar having two spaced vertical drillings to receive a pair of parallel vertical rods 17, 18 which are supported by similar frictionless linear bearings 19, 20. The lower ends of each pair of rods 17, 18 are rigidly attached to a cross piece 21 (Figure 3) having an accurately ground flat horizontal undersurface and the upper ends are secured to a head 22 which constitutes one of the two supporting members for the workpiece platform. The two heads 22 are each attached to side brackets 23 (Figure 4) which support a pair of vertical trunnions 24 in vertical bearings, one of these trunnions 24 being shown in section in Figure 4. The upper end of each trunnion is formed with a pair of spaced ears 25, 26, forming a fork and each ear is bored to receive a pin 27. The two pins 27 support a platform 28, one of the pins being a close fit in a corresponding drilling in the platform while the other pin is a close fit in a block 34 which is mounted so as to be capable of limited horizontal sliding movement in a rectangular slot 35. The platform 28 is formed with a supporting pillar 29 at one end and this pillar is provided with means for gripping the root of a turbine blade 30 to be machined, including a pair of serrated jaws 31, 32 and clamping mechanism operated by a manual lever 33.

It will be seen that each of the heads or supporting members 22 is capable of being raised or lowered independently in accordance with the vertical movements of the respective pairs of parallel supporting rods 17, 18, and is also capable of horizontal movement from left to right in accordance with movement of the respective slide 11 or 12. The instantaneous positions of the two heads 22 determines the position and attitude of the platform 28 and hence of the turbine blade 30, the necessary pivotal movements being accommodated by the vertical trunnions 24 and the horizontal pins 27, while the variation in the distance between the two pins 27 at different inclinations is accommodated by the movement of the block 34 in the slot 35.

Figure 3:
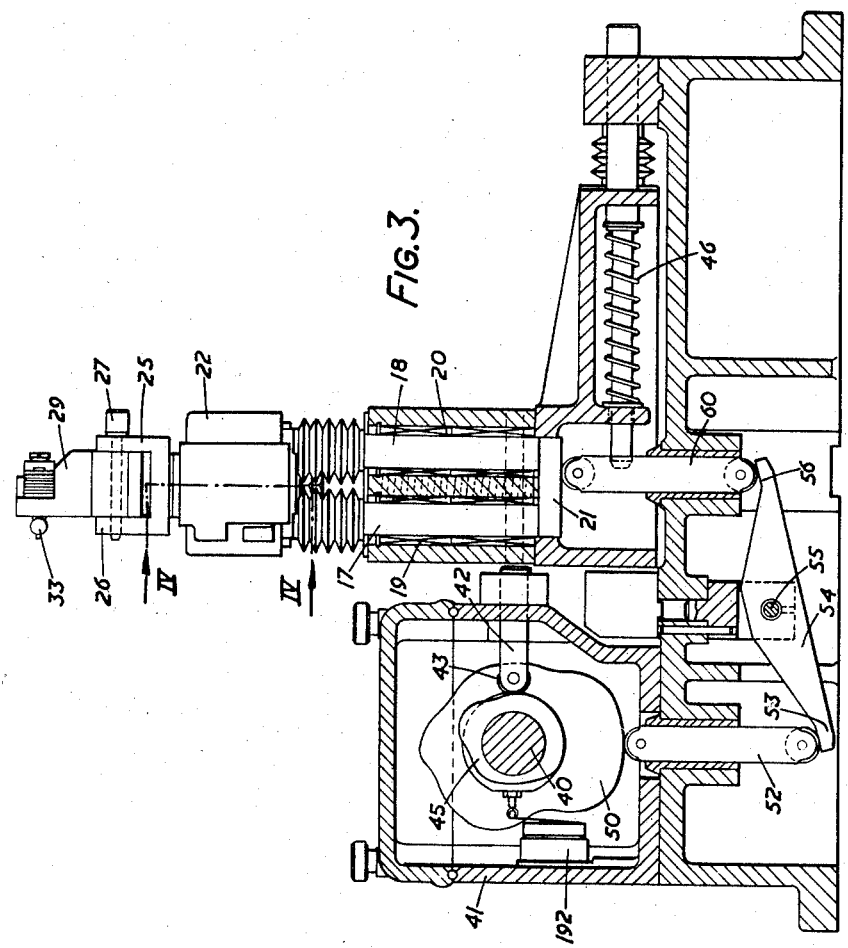
Figure 3 is a sectional front elevation on the same scale as Figure 2 on the line III—III in Figure 2.
Figure 4:
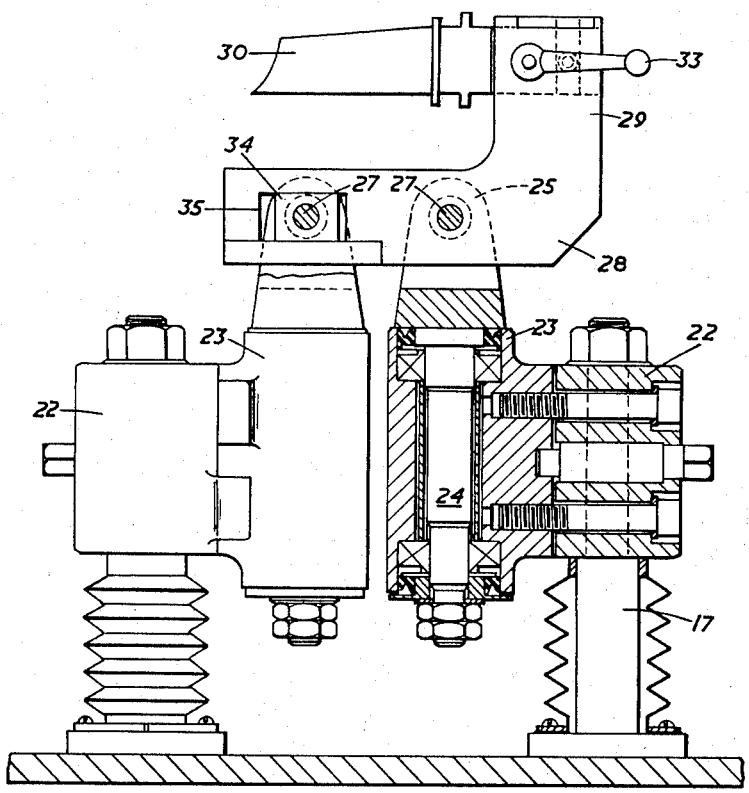
Figure 4 is a side elevation on a further enlarged scale of the upper part of the work supporting mechanism, partly in section on the line IV—IV in Figure 3.
Figure 5:
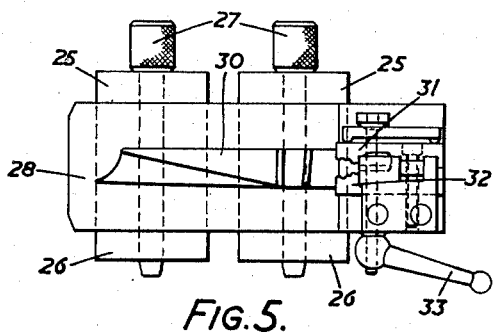
Figure 5 is a plan view of the work supporting platform shown in Figure 4.

The horizontal movements of the slides 11, 12 and the vertical movements of the two pairs of supporting rods 17, 18 are controlled by a single horizontal camshaft 40 mounted in a casing 41 and driven by a constant speed electric motor (not shown). The horizontal movements of the slides are each controlled by cam followers in the form of push rods, one of which is shown in Figure 3 at 42, passing through a guide sleeve in the side of the casing 41 and abutting at its outer end on part of the respective slides 11, 12 and at the other end through a follower roller 43 on one of two cams 44, 45. The slides 11, 12 are urged towards the camshaft by springs, one of which is shown at 46 in Figure 3, so that the lateral positions of the two slides are controlled accurately and independently by the form of the cams 44, 45.

The vertical movements of the two heads 22 are independently controlled by a pair of cams 50, 51 which act directly on a pair of vertical push rods, one of which is shown at 52 in Figure 3. The rod 52 is formed at each end with rollers and the lower roller bears on an accurately ground flat surface 53 on a rocking lever 54 pivotally mounted at 55 on a pin rigidly mounted on the base of the machine. The lever 54 has a similar accurately ground face 56 at its other end, the two faces 53, 56 lying in a common plane. A second vertical push rod 60 is mounted in bearings in the base structure 10, the lower end of this rod having a roller which bears on the face 56, while the upper end of the rod is provided with a roller which bears on the lower face of the block 21 at the lower end of each pair of supporting rods 17, 18. Thus it will be seen that the vertical position of each block 21 is determined individually by the forms of the cams 50, 51. The position of each block 21 is unaffected by the horizontal position of the respective slides 11, 12 since the under face of each block is flat and horizontal.

The apparatus includes a pair of cutting members each comprising a flexible abrasive belt, indicated at 80, 81 in Figure 1, passing over a pair of movable noses or guides 82, 83, lying on opposite sides of the workpiece 30 to be machined. Each nose is wedge shaped with a part-cylindrical inner tip such that the abrasive belt in contact with this tip adopts a part-cylindrical contour. Means are provided for cooling the two noses including internal drillings 84, 85 as shown in Figure 6, having transverse drillings extending outwards to spaced points on the surfaces of the noses to cool the inside of the two belts. Cooling air is supplied to these drillings through two flexible conduits 86, 87.

Each abrasive belt is a continuous loop, passing over a pair of guide rollers 90, 91 and a driving pulley 92, the tension in the belt being maintained by a jockey pulley 93 mounted on a pivoted arm 94 which is acted on by a spring plunger 95. Each arm 94 is formed with a stop 96 which engages a fixed abutment 97 to limit the inward movement of the jockey pulley so that as each guide nose is withdrawn from its cutting position the tension in the belt is automatically reduced to reduce the frictional effect on the nose when the respective belt is out of operation.

The two noses 82, 83 are mounted on a common support 110 which is mounted to slide horizontally on two vertically spaced parallel guide bars 111 and 112. The support 110 is connected to a double acting reciprocating pneumatic ram 113 (see Figure 6) through a linkage 114, 115, and the limits of movement of the support in either direction are controlled by adjustable stops 116, 117 cooperating with abutments 118, 119 attached to the support. It will be seen that the stop 117 determines the limit of movement of the nose 82 to the right in Figure 1 and thus determines the depth of cut made by the abrasive belt 80. Similarly the stop 116 determines the position of the nose 83 and the depth of cut taken by the abrasive belt 81.

The two adjustable stops 116, 117 bear on their outer opposite ends against adjusting rods 120, 121, each of these rods being tapered towards its end which is in contact with the respective stops 116, 117, as shown in Figure 6. Means are provided for automatically withdrawing the two rods rearwards progressively, thus allowing the stops 116, 117 to move slowly apart during the working cycle, so as to progressively increase the depth of cut taken by the abrasive belts.

The withdrawal means for the adjusting rods 120, 121 comprises a pair of double acting pneumatic cylinders 130, 131, each containing a piston 132, 133 (as shown in Figures 6 and 7), having a piston rod which is connected respectively through a rocking lever 134, 135 (omitted for simplicity in Figure 7) to a pivotal joint on the respective adjusting rods 120, 121. The adjusting rods 120, 121 are also connected respectively to a hydraulically controlled escapement mechanism comprising a pair of pistons 140, 141 lying in hydraulic cylinders 142, 143. The flow of hydraulic liquid to and from these cylinders is controlled by a valve unit 144, and the circuit also includes a hydraulic reservoir 145.

The valve unit 144 comprises essentially a pair of valve chambers in one of which lies a free piston 150 while the other contains a shuttle type reversing valve 151. The limits of movement of the free piston 150 are determined by an adjustable stop 152 and the two ends of this valve chamber are connected to intermediate ports in the other chamber containing the reversing valve 151.

Hydraulic escape mechanism of this general kind is described and claimed in copending application Ser. No. 619,035, filed October 29, 1956, by Henry J. W. Huckstep. The air and liquid connections between the valves and cylinders are omitted for clarity in Figure 6, and the automatic hydraulic and pneumatic control circuits are illustrated diagrammatically in Figure 7, the hydraulic connections being shown for convenience by chain lines to distinguish them from the pneumatic circuit. Compressed air is supplied through a main supply passage 160, one branch of this passage leading to a solenoid operated reversing valve 161, while another branch leads to a solenoid operated reversing valve 162, each of these valves also having a connection to a low pressure air return line 163. The reversable outlet connections 164, 165 from the valve 161 lead to opposite ends of the pneumatic ram 113 which actuates the support 110 carrying the two noses 82, 83. The reversable connections 164, 165 are also connected to opposite ends of a second double acting pneumatic ram 166, the piston of which is connected to the reversing valve 151 forming part of the valve unit 144 so that this valve is automatically reversed when the present connections to the ram 133 are reversed. The reversable connections 164, 165 are also connected respectively through manually adjustable flow control valves 167, 168 to the cooling air supply conduits 86, 87 by which cooling air is supplied to the noses 82, 83.

The solenoid operated valve 162 has reversable outlet connections 180, 181 which are connected to the opposite ends of each of the pneumatic ram cylinders 130, 131. The connection 181 is also connected through a manually adjustable flow control valve 182 with a nozzle 183 from which cooling air is directed on to the surface of the blade 30 being machined.

The operation of the circuits illustrated in Figure 7 is as follows:

Initially the valve 162 which is under the control of a main electric starter switch is in position where the passage 181 is connected to the high pressure supply while the connection 180 is connected to relief. The two pistons 132, 133 are in their limiting rearward positions in Figure 6, or frontward positions in Figure 7, that is to say the adjusting rods 120, 121 are projected fully forwards in Figure 6 so that the adjustable stops 116, 117 are in their innermost positions.

Compressed air is then supplied through the main supply line 160 and passes through the valve 162 and connection 181 to exert pressure on the faces of the pneumatic pistons 132, 133 thus tending to urge the two adjusting rods 120, 121 rearwards. The movement of these rods is temporarily resisted however by the hydraulic liquid which is locked behind the pistons 140, 141 in cylinders 142, 143. Compressed air is also passed through the solenoid operated valve 161 to one end of the pneumatic ram 113, thus urging one of the noses 82, 83 in contact with the blade to be machined, and also supplying cooling air to the appropriate nose 82, or 83.

Figure 2:
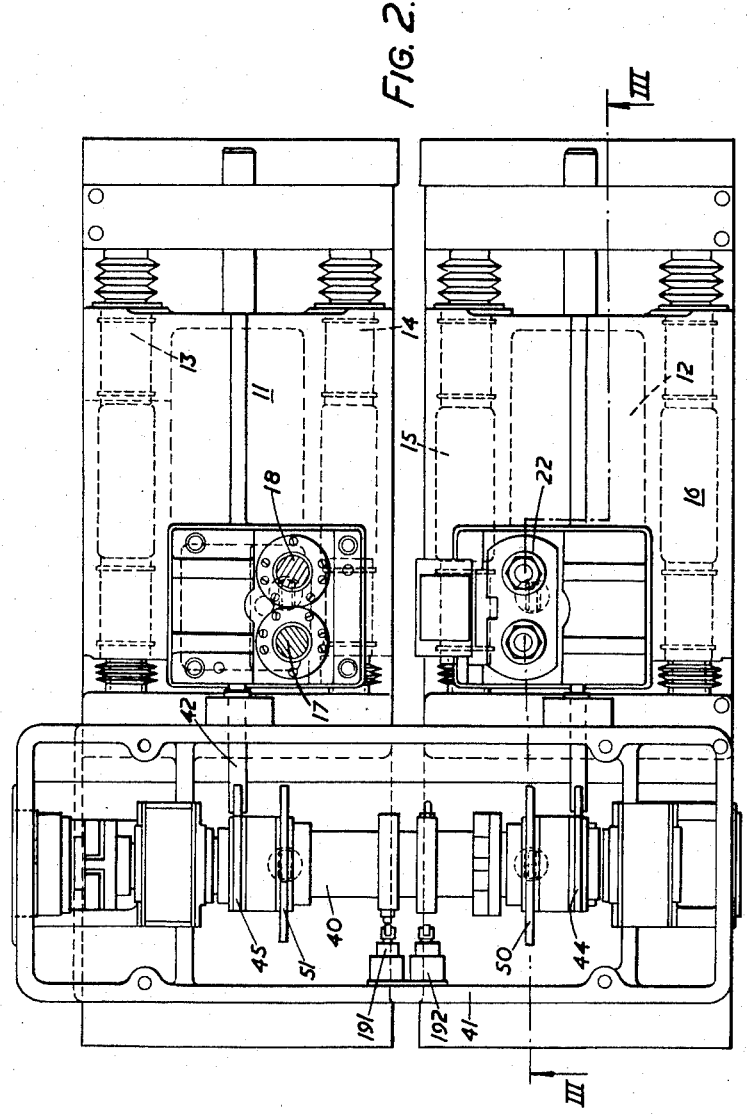
Figure 2 is a plan view on a slightly larger scale of the lower part of the machine partly in section on the line II—II in Figure 1.

After the completion of a half cycle of rotation by the camshaft 40, corresponding to the machining of the convex or concave side of the blade 30, one of a pair of microswitches 191, 192 (Figure 2) is actuated to reverse the valve 161. Air is then admitted to the opposite end of the ram 113 causing the noses 82, 83 to move across together on the support 110, and at the same time this reversal of the connections 164, 165 operates the pneumatic ram 166 to reverse the valve 151.

One end of the valve chamber containing the piston 150, which was previously connected to a low pressure return line 190, is then connected to the high pressure side of one of the hydraulic ram cylinders 142, 143. For example in the position illustrated in Figure 7 the left hand end of the chamber is connected to the left hand ram cylinder 142. The pressure developed in the cylinder 142 by the air pressure in cylinder 130 thus causes the free piston 150 to move to its opposite limiting position displacing a predetermined quantity of fluid which allows the piston 140 and hence the adjusting rod 120 to be withdrawn a predetermined short distance. This allows the stop 116 to move outwards a predetermined small distance. The liquid on the opposite side of the free piston is allowed to return to the relief line 190. It will be seen that the fluid in the other ram cylinder 143 is meanwhile locked up until the next reversal of the valve 151. Thus at each reversal movement of the valve 161 and hence of 151, the adjusting rods 120, 121 are allowed to take alternate short steps rearwards, so progressively increasing the depth of cut made by the abrasive belts.

As mentioned above the solenoid operated valve 161 is reversed automatically at every half cycle of the camshaft 40 by means of the microswitches 191, 192. The camshaft, driving motor (not illustrated) is automatically stopped when the machining operation is complete by means of a second pair of microswitches 193, 194 (Figure 6), which are operated by the rocking levers 134, 135, when the rods 120, 121, have been withdrawn a predetermined distance, that is to say when the steps 116, 117 have reached their limiting positions and the final cut has been made on the blade 30 being machined.

What we claim as our invention and desire to secure by Letters Patent is:

1. Apparatus for machining a workpiece to a predetermined contour comprising a cutting member having an effective cutting surface which is substantially in the form of part of a surface of revolution, means for bringing the cutting member into engagement with the workpiece, and means for moving the workpiece relative to the cutting member in a predetermined manner, to provide the desired contour thereon, including a supporting platform to which the workpiece to be machined can be secured, a pair of supporting members pivotally connected to two spaced points on the platform each supporting member being constrained to move in two directions at right angles to one another and at right angles to the axis of revolution of the cutting surface and held against rotation about the axis of the cutting surface, and including cam means controlling the movement of each supporting member independently in its direction of movement.

2. Apparatus as claimed in claim 1, in which the cutting member comprises an endless flexible abrasive belt, and a guide having an effective surface of part cylindrical shape, over which guide the belt passes.

3. Apparatus as claimed in claim 1 including two cutting members disposed on opposite sides of the supporting platform, and means for bringing the cutting members alternately into engagement with the opposite sides of the workpiece.

4. Apparatus as claimed in claim 3, in which the effective cutting parts of the two cutting members are mounted on a common reciprocating support.

5. Apparatus as claimed in claim 1, including feed means feeding the cutting member progressively towards the workpiece up to a limiting position, so as to remove material progressively from the workpiece and provide a progressively increasing depth of "cut."

6. Apparatus as claimed in claim 5, in which the feed means is of a step-by-step type and is synchronised automatically with the means controlling the movement of the workpiece, so that the cutting member is moved inwards one step after each cycle of movement of the workpiece.

7. Apparatus as claimed in claim 6, in which the feed means comprise a fluid operated ram acting against an adjustable stop.

8. Apparatus as claimed in claim 1 in which the pivotal connections between the supporting members and the work supporting platform are arranged to permit relative pivotal movement between the supporting members and the platform about axes parallel to both the directions of movement of the supporting members.

9. Apparatus as claimed in claim 8, including means for permitting at least limited movement between the two pivotal connections in a direction parallel to the axis of the cutting surface, to allow for the tilting movement of the platform.

10. Apparatus as claimed in claim 8 in which the pivotal connections between the supporting members and the platform comprise a pair of forked members pivotally attached to the two ends of the platform, with their pivotal axes parallel to but spaced from one another, each forked member having a pivotal connection with the supporting member about an axis normal to the respective pivotal axis between the forked member and the platform, and intersecting or lying closely adjacent to the said axis.

11. Apparatus as claimed in claim 1 in which the supporting members are each mounted for movement in one direction on a carrier member which is mounted for movement in the other of the two directions of movement referred to, the supporting members and carrier member each being controlled independently by cam followers cooperating with synchronised cams.

12. Apparatus as claimed in claim 11, in which the cams are mounted on a common cam shaft, and including cam follower devices, the two cam follower devices which act on the supporting members each including a roller engaging a surface parallel to the direction of movement of the carrier member, to permit independent movement of the carrier member without any corresponding displacement of the supporting member in directions normal to the direction of movement of the carrier member.

13. Apparatus as claimed in claim 8, including two cutting members disposed on opposite sides of the supporting platform, and means for bringing the cutting members alternately into engagement with the opposite sides of the workpiece.

14. Apparatus as claimed in claim 13 in which the effective cutting parts of the two cutting members are mounted on a common reciprocating support.

References Cited in the file of this patent

UNITED STATES PATENTS

| 2,426,764 | Czarnecki | Sept. 2, 1947 |
| 2,587,603 | Czarnecki | Mar. 4, 1952 |